United States Patent
Braden (10) Patent No.: US 9,350,847 B2
(45) Date of Patent: *May 24, 2016

(54) DIFFERENTIATED ACCESS FOR MOBILE DEVICE

(71) Applicant: Miles Jennings Braden, San Diego, CA (US)

(72) Inventor: Miles Jennings Braden, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,482

(22) Filed: Jul. 6, 2015

(65) Prior Publication Data

US 2015/0334217 A1 Nov. 19, 2015

Related U.S. Application Data

(63) Continuation of application No. 14/280,568, filed on May 17, 2014, now Pat. No. 9,104,850.

(51) Int. Cl.
*H04M 1/673* (2006.01)
*G06F 21/31* (2013.01)
*H04W 12/08* (2009.01)
*G06F 21/62* (2013.01)
*G06F 3/06* (2006.01)

(52) U.S. Cl.
CPC .............. *H04M 1/673* (2013.01); *G06F 21/31* (2013.01); *G06F 21/62* (2013.01); *H04W 12/08* (2013.01); *G06F 3/0637* (2013.01)

(58) Field of Classification Search
CPC ...................................................... G06F 3/0637
USPC ........................................................... 726/19
See application file for complete search history.

(56) References Cited

U.S. PATENT DOCUMENTS

| | | |
|---|---|---|
| 7,086,008 B2 | 8/2006 | Capps et al. |
| 2002/0133590 A1 | 9/2002 | McBrearty et al. |
| 2011/0289138 A1 | 11/2011 | Turakhia |
| 2011/0321156 A1 | 12/2011 | Smith |

*Primary Examiner* — Jacob Lipman

(57) ABSTRACT

Mobile devices and methods are disclosed for providing privacy and confidentiality of information through the provision of multiple profiles that control access to the information, and operation of the mobile device in accordance with a profile chosen by entry of an associated access code.

18 Claims, 7 Drawing Sheets

DIFFERENTIATED ACCESS FOR MOBILE DEVICE

This application is a continuation, pursuant to 35 USC 120, of copending U.S. application Ser. No. 14/280,568, filed on May 17, 2014 and incorporated herein by reference.

FIELD\

The present work relates generally to mobile data processing devices (mobile devices) and, more particularly, to controlling access to information and functionality normally accessible in a mobile device.

BACKGROUND

The normal login process for a mobile device such as a mobile phone involves entry of a password for a single user at an interface with/to the device.

Figure 1:
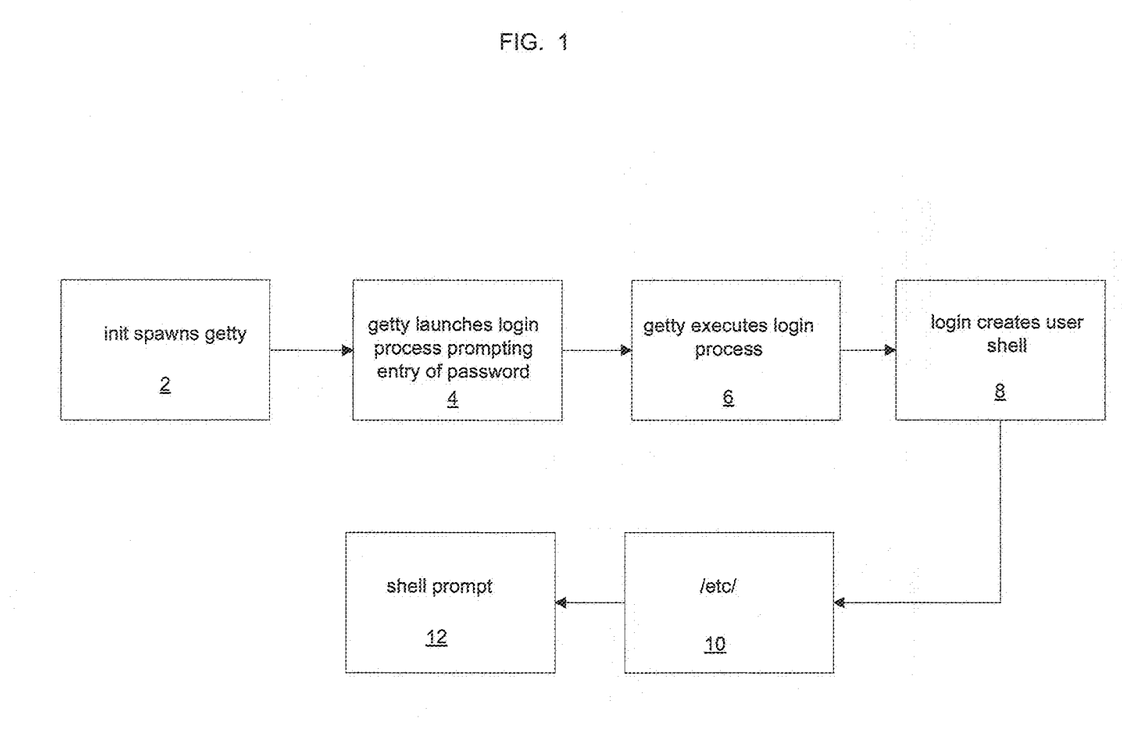
FIG. 1 diagrammatically illustrates procedures typically associated with a login process in the prior art.

FIG. 1 diagrammatically illustrates procedures typically associated with logging in to a conventional mobile device having an Android Operating System. At module 2, upon device startup, the initialization process, init, launches (spawns) getty, a program that, among other things, sets the device configuration for the user and spawns a login process. At module 4, getty launches the login process, which first prompts the user to enter a password for access to the mobile device. At module 6, with a proper password entered, getty continues to execute the login process. Module 8 represents creation, by the login process, of a user shell in user space for the user that has logged in. This user shell, unique to the user, implements known configuration information for the user, for example, a particular text font, file histories, a default editor, etc. This configuration information resides in a folder known as the etc folder (see module 10). Module 12 represents a shell prompt that signals completion of the login process, indicating that the shell has been created, and programs and processes are ready for execution in accordance with the shell.

BRIEF DESCRIPTION OF THE DRAWINGS

Applicable reference numbers have been carried forward.

DETAILED DESCRIPTION

Figure 2:
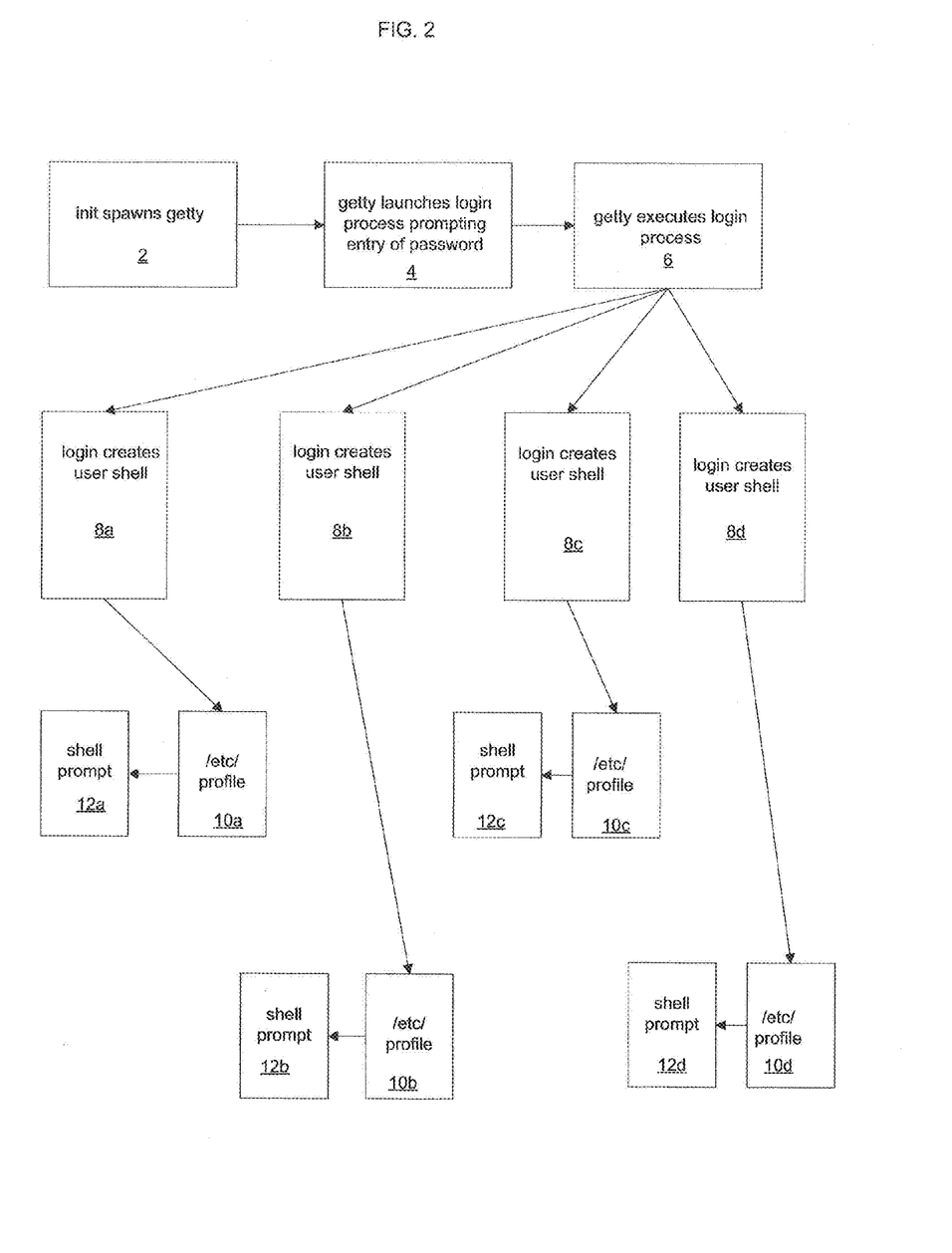
FIG. 2 diagrammatically illustrates a modification of FIG. 1 according to a first example embodiment.

Example embodiments according to the subject invention provide a login process that is modified relative to that described above in order to allow the creation of multiple user shells, wherein each user shell has associated therewith a profile that defines user access to the device. More specifically, the profile specifies which device applications, alerts, notifications, other information, etc., will be accessible and/or perceptible to the user. Considering the example of a mobile device using the android operating system or a modified Linux operating system, the login process can be readily changed using well known rules for modifying the Linux login process. FIG. 2 diagrammatically illustrates a modification of FIG. 1 according to a first example embodiment. At module 6A, the getty executes a modified login process that provides for creation of a plurality of user shells, with each user shell having at least one associated user profile derived from a master profile of the mobile device. As used herein, a master profile is a default profile that provides access to and visibility of all applications and information available in the mobile device. The user shells are designated 8a-8d, and are respectively associated with modules 10a-10d (including profile information) and modules 12a-12d (shell prompts).

Figure 3:
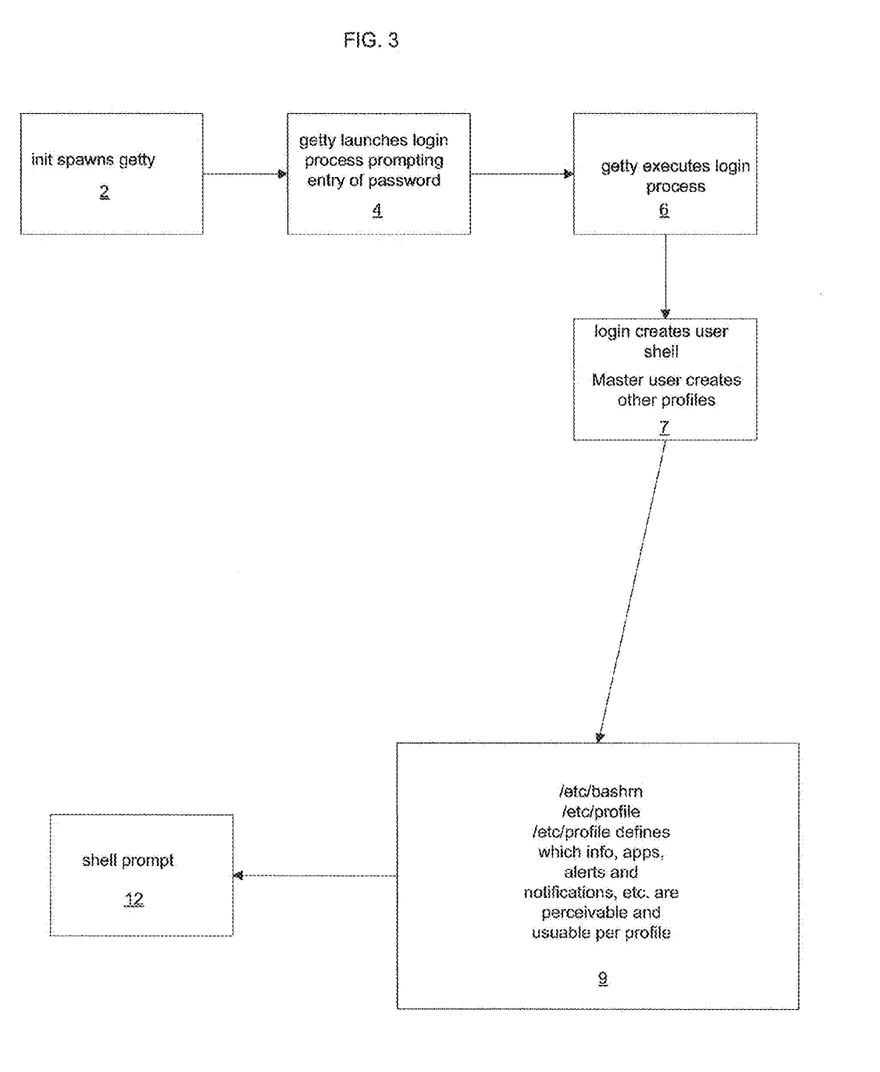
FIG. 3 diagrammatically illustrates a second example embodiment.

Some example embodiments of the subject invention provide a modified login process that creates only a single user shell which has an associated profile configuration file that defines several of the profiles shown in FIG. 2. FIG. 3 diagrammatically illustrates a second example embodiment in which, at 6B, the getty executes a modified login process that provides for creation of a single user shell using a master profile at module 7. In module 9, a profile folder (located in the Android etc folder in this embodiment) contains definitions for each of a plurality of user profiles, that specify which information, applications, alerts and notification, etc. are perceivable and usable under the profile (see also modules 10a-10d of FIG. 2). At module 12, the shell prompt signals completion of the login process, indicating programs and processes are ready for execution in accordance with any of the various user profiles defined in the profile folder, when a user inputs a particular profile selection to the mobile device through the device interface.

According to one aspect of the invention, privacy concerns associated with a mobile device, including a smart phone, iPad, iPod, tablet and the like are addressed by an operating system configured to run on the mobile device or by one or more applications that run on the mobile device. The invention is also well suited to address privacy concerns while sharing a mobile device with others. An access password that allows access to the mobile device also controls the level of access within the mobile device.

In one example embodiment of the invention, a Master Mode application will run as part of the login process. This allows the operator to manage profiles for, for instance, an android device. When the operator logs in with a Master Mode password/passcode/access code, the operator will have access to the Master Mode application, which allows management of profiles and passwords. As used herein throughout, the terms password, passcode and access code are used interchangeably. The operator will be prompted to create a name for the profile, then a password. The operator is then prompted to select the apps that will be supported in that profile. As an example, the operator can create an entertainment profile which provides access only to multimedia apps, and/or a business profile that provides access only to apps that pertain to financials or related presentations; indeed, the number of possible profiles pertinent to a particular use by the operator is nearly without limit. In addition, the operator may, for instance, create a public profile in which camera, IM, email, Instagram, Facebook and other such apps will be blocked from view or at least inaccessible for use.

In another embodiment, the Master Mode application resides in a suitably modified android operating system. The login process calls a modified password handler that has been modified relative to the conventional password handler such that, when the Master Mode password is entered, a menu will be made available to the operator that will allow the operator to name and create profiles, and assign corresponding profile passwords. In contrast, upon entry of a password that is not the Master Mode password, no menu for profile management appears. The user is allowed to proceed with normal android operating system access in accordance with the constraints defined by the profile associated with the password.

When the master profile is operative, the user has access to a Call Block editor for specifying blocked incoming and outgoing phone numbers and SMS/text message numbers. However, access to the Call Block editor may be prevented when one or more other profiles are operative, depending on the profile definition. Even if a given profile does not explicitly prevent access to the Call Block editor, some embodiments will nevertheless prevent access to the Call Block editor if the profile prevents access to phone and/or SMS/text services.

In some embodiments, an access procedure to a mobile device may generally follow the familiar procedure that users experience with a personal computer (PC). However, in response to entry of the Master Mode password, the access procedure allows the device owner to configure a number of profiles having distinct passwords. The visibility, functionality access and/or awareness of defined device properties may be configured during operation under the Master Mode password. In configuring the profiles, the device owner may determine, for each profile, access, visibility and awareness of applications on the mobile device. As an example, while operation under the master profile provides access to all applications, data etc., on the mobile device, other profiles can prevent, for example, seeing and/or hearing alerts, and/or access, etc., to incoming text messages, e-mails, etc. More generally, each profile such as shown in FIGS. 2 and 3 is in all cases a subset of the master profile, because the access, visibility and awareness of applications and information, as defined by each profile, is a subset of the (complete) access, visibility and awareness defined by the master profile. The master profile permits unlimited access/visibility/awareness of the functionalities of the device, and all other profiles limit, in some way, access/visibility/awareness of the functionalities of the device.

Figure 4:
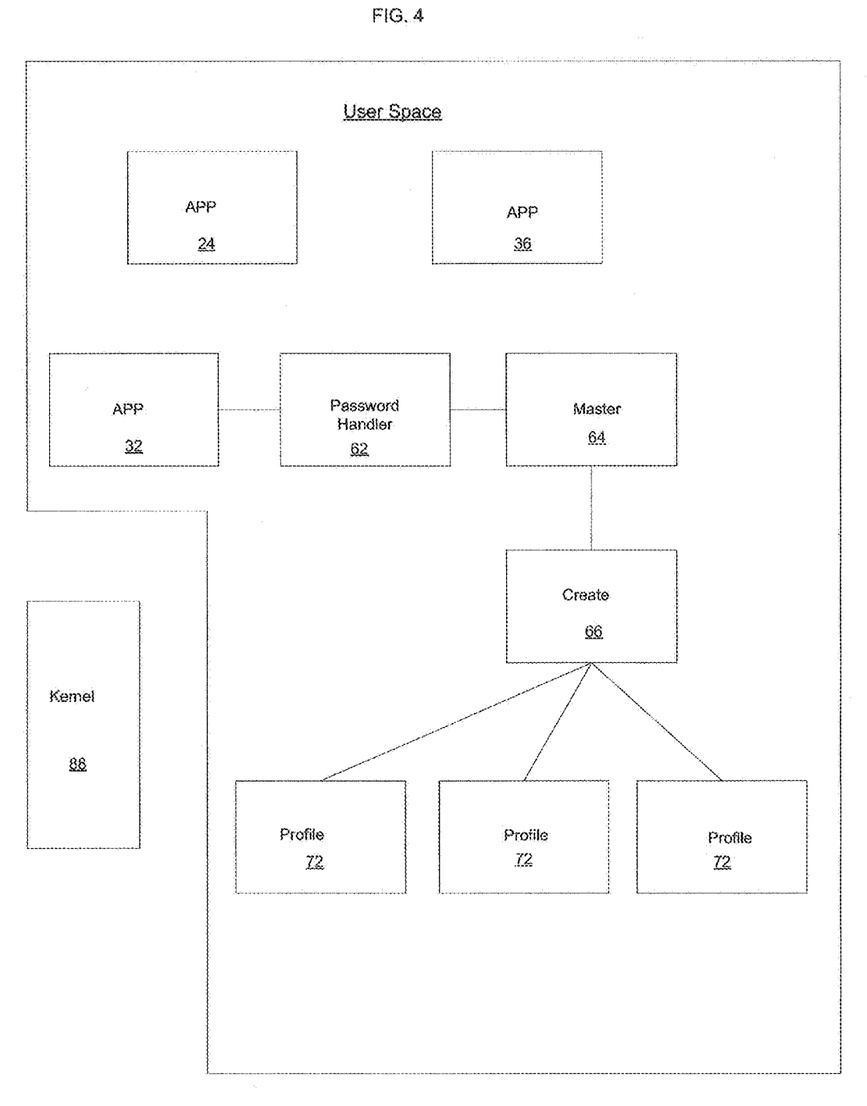
FIG. 4 diagrammatically illustrates one example implementation of a login process according to example embodiments.

One implementation of a login process modified according to example embodiments is diagrammatically illustrated in FIG. 4, where application APP 32 is illustrated along with other applications, (APP 34 and APP 36) juxtaposed next to the kernel 88. APP 32, in particular, governing passwords, resides in the user space 100 of an operating system such as the Android operating system. For any Open Source-type operating system, user space 100 lies outside of kernel 88 (e.g., Linux kernel, Android kernel, etc.). The modified login process calls password handler 62 which handles password functionality and, in various embodiments, is implemented in software, hardware or a combination thereof. The password handler 62 is modified (relative to the prior art password handler) such that when the master mode password is entered, a menu represented by element 64 is generated, preferably on a display of the mobile device, and is made available to the operator to allow, at 66, creation of profiles 72 and associated passwords.

In one example implementation, a profile may exclude e-mail from a designated person from being visible, while operating the mobile device, by placing such e-mail messages in a hidden file, namely, a file whose contents or existence will not be apparent when operating a device under a particular profile. This may be accomplished through a rule set up in connection with a macro run at the beginning of a change of profiles. The macro causes existing e-mail messages, as designated by the profile parameters, to be placed in the hidden file. While the device is operating under a designated profile, messages to and from a designated e-mail address are placed within the hidden file, and corresponding reception alerts are not presented to the user.

Figure 5:
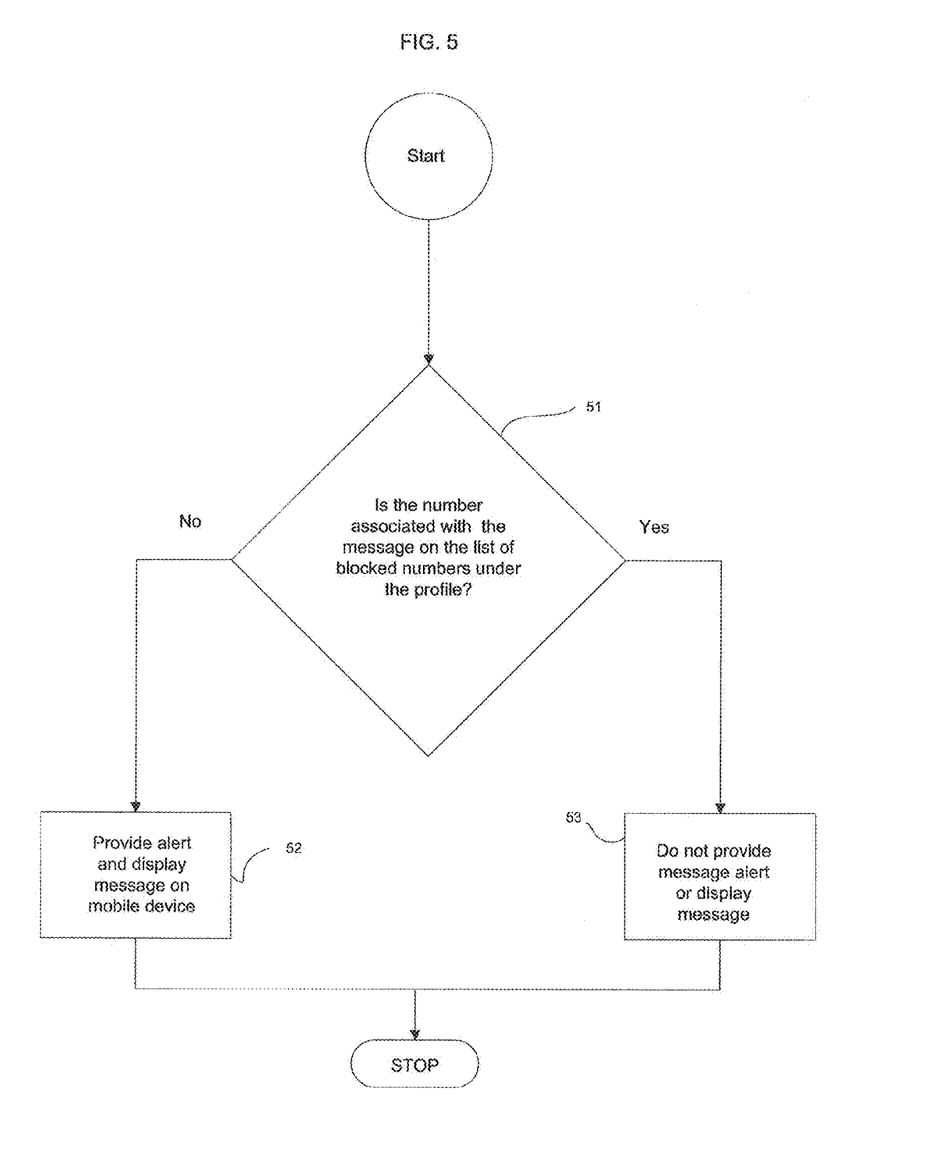
FIG. 5 is a flowchart showing processing of incoming/outgoing calls and SMS/text messages according to example embodiments.

Some embodiments provide for blocking incoming and outgoing phone calls and incoming and outgoing text messages. Each profile may have an associated list of blocked numbers. One or more profiles may implement a common or general list of blocked numbers. FIG. 5 is a flowchart showing a process for processing incoming/outgoing SMS/text messages according to example embodiments. A request for telephony services occurs when, for example, a test message is received. At 51, the source number of the incoming message is checked against the list of blocked source numbers for the profile with which the operator is logged in. If the number is not on the list then telephony services shall proceed normally at 52, to provide the incoming SMS/text message notification and display the message. The notification may include, for example, an audible notification and/or a pop-up message on the mobile device display screen. However, if the number is on the list of blocked source numbers for the current profile then, at 53, no notification or display of the incoming text message occurs. The message is, however, still available for later access if the operator switches to a profile that allows SMS/text messages for that particular number. Outgoing SMS/text messages are handled in analogous fashion, such that telephony services are requested for an outgoing message only if the destination number of the message is not a destination number blocked by the operative profile.

Similarly, in some embodiments, a list of blocked source numbers for incoming calls according to the currently operative profile shall be checked before allowing notification to the operator that an incoming call is available. If the source number of the call is on the list, then the operator is not notified of the call nor is the call displayed on the list of incoming calls until the operator logs into a different profile that will allow incoming calls from that particular number. Outgoing calls are processed in analogous fashion. All outgoing calls are checked against a list of blocked destination numbers for the current profile, and telephony services are denied if the destination number of the call is on the list.

Figure 6:
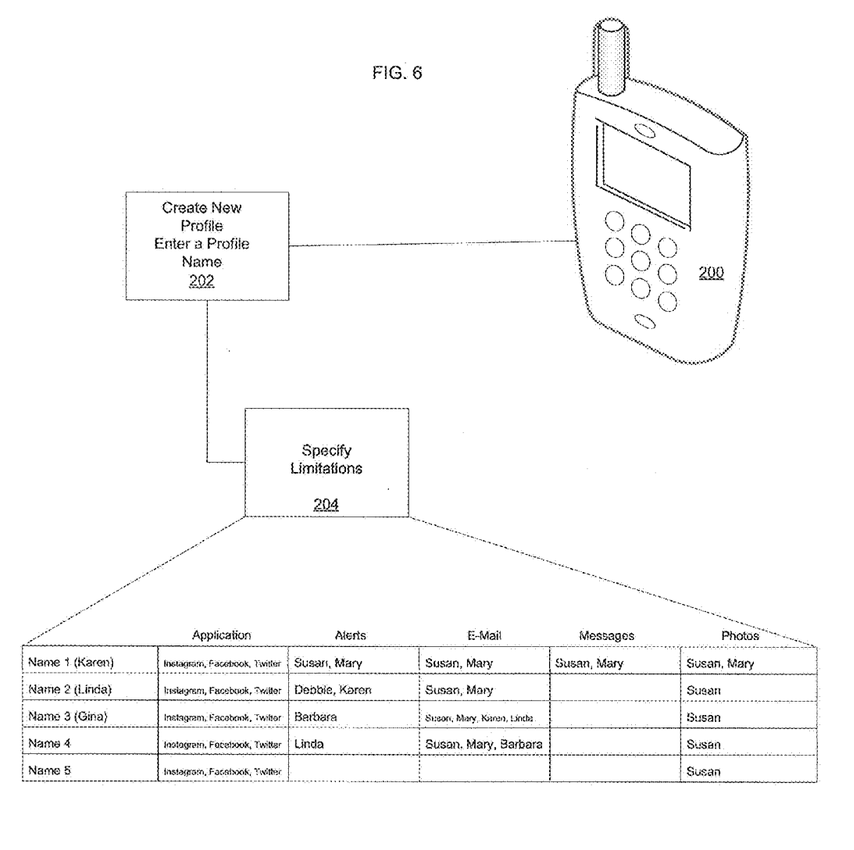
FIG. 6 diagrammatically illustrates a privacy function according to example embodiments that configures a mobile device such that selected information is not perceived while operating the mobile device under a particular profile.

FIG. 6 diagrammatically illustrates a privacy function that configures a mobile device to prevent selected information from being perceived while operating the mobile device under a selected profile according to example embodiments. In response to input at mobile device interface 200, a profile name and corresponding password are created at module 202, and individual perception limitations are specified at module 204 to carry out preferences such as indicated in table 206. Individual photos can be marked for exclusion per profile and placed into a hidden file so that the appropriately marked photos are not displayed during operation of the mobile device under the desired profile. Accordingly, a sort operation may be performed at initiation of operation under a profile so that selected photos are placed into or removed from the hidden photo file. Any visible count of available photos will not indicate the absence of photos that have been placed in the hidden file.

Figure 7:
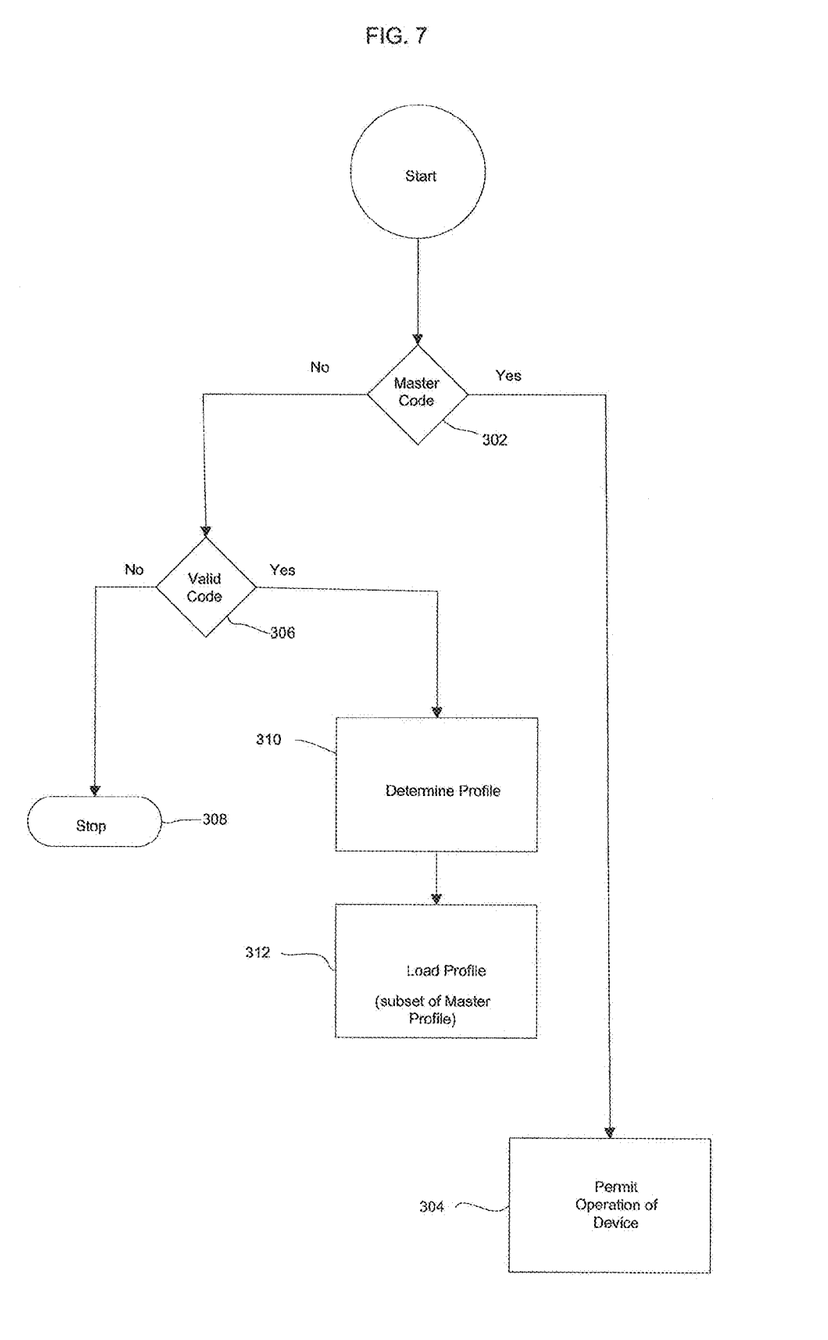
FIG. 7 is a flowchart illustrating a mobile device access code process according to example embodiments.

Device access is achieved through a typical security screen through which a password is entered and verified if correct. FIG. 7 is a flowchart illustrating a mobile device access code process according to example embodiments. A determination is made at 302 of whether a master code has been received by a mobile device for access to the device. If the master code has indeed been entered, full access to the mobile device capabilities (i.e., operation in accordance with the master profile) is allowed at step 304. Otherwise, a determination is made at step 306 of whether a valid access code for any other available profile has been received by the mobile device. If a determination that no valid access code has been entered, access to the mobile device is refused and the process halts at step 308. Should a determination be made at step 306 that a valid access code corresponding to one of the other available profiles has been entered, the profile corresponding to the received access code is determined at 310, and loaded at 312, and device access in accordance with that profile (a subset, of course, of the master profile) is allowed at step 304. While a user enters an access code into a device to select a profile, the existence of other profiles available for selection is not revealed. Consequently, there is no indication that other profiles exist for the mobile device.

In some embodiments, one or more of the profiles, each being a proper subset of the master profile, may be configured in what shall be referred to as "player mode." In player mode, the mobile communications device, such as a mobile phone, is setup so as to conceal certain information from a user of the electronic device. For instance, if the mobile phone owner is dating several people, it may be desirable during a date not to be interrupted by a girlfriend or boyfriend sending text messages or calling, especially while the communications device is in the hands of or is perceivable by the dating companion. Further, when, for instance, an owner's phone is being used/inspected by his/her date, it may be desirable for the existence of certain contacts on the phone, photos, texts messages and alerts to be imperceptible while operating the phone under a given profile. As such when the mobile phone is operated by a date under a corresponding selected player profile, the date may only see innocuous text messages, e-mail messages, photos and the like should that individual attempt to ascertain information on the mobile device, e.g., phone, etc.

In one example, should Suzie be given access to Bob's phone through use of a password corresponding to one of Bob's player profiles, Suzie may be limited to observing a truncated list of contacts which don't include Bob's other girlfriends. Additionally, Bob's phone log information including calls to and from Bob's other girlfriends may be imperceptible or excluded from view while the phone is operating under a profile determined suitable for Suzie's use. While Suzie is using Bob's phone, she may feel great comfort in having Bob's phone password and thus such a password can be readily given to Suzie. For instance, Suzie may find herself as the sole female on the list of Bob's contacts save for Bob's mother, sister and minister.

In another example of the functionality that can be derived by the subject invention, Karen the primary user, may allow Steve, Karen's boyfriend to use her phone under a selected player profile, similar to a player profile as described in the forgoing example relating to Bob. However, with the player profile in use on Karen's phone by Steve, certain social media applications such as Instagram™ Twitter™, Facebook™, etc. may not be perceivable on the phone. Associated application alerts, application messages and application contacts are likewise not perceivable by phone users, e.g., Steve, while using Karen's phone with this player profile.

In some embodiments, each of the aforementioned shells (see, e.g., 8a-8d of FIG. 2) implements a unique context for the operation of the mobile device. An application that performs a desired function or transaction may require different input parameters depending on the context of operation. As a simple illustrative example, consider an application that generates correspondence. For such an application, information such as that inserted in a letterhead will likely be different in a business context of operation than in a personal context of operation. For example, the business context may require insertion of a business address, and the personal context may require insertion of a home address which is different from the business address. A shell for the business context would therefore supply the application with parameters suitable to cause insertion of the business address, whereas a shell for the personal context would supply the application with parameters suitable to cause insertion of the home address. The business and personal shells may also supply parameters (suitably tailored in accordance with business and personal contexts of operation, respectively) to a variety of other applications on the mobile device.

In some embodiments, the context of operation of the mobile device (e.g., business or personal) is determined by a selected shell, and a selected profile (e.g., one such as described above) controls access, visibility and awareness of the applications on the mobile device. Both the shell and the profile may be associated with the user-selected password. In some embodiments, each of a plurality of profiles is available for use in conjunction with each of a plurality of available shells, and vice versa. Note, for example, that either of the aforementioned business and personal shells could even be operative in conjunction with a profile that prevents access to the aforementioned correspondence application anyway.

Workers in the art will recognize from the foregoing description that the above-described structures and functions are readily incorporated into various mobile devices having various operating systems. Examples of mobile devices include phones, tablets, etc.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-readable media by which the foregoing may be implemented may include, for example, computer executable instructions and data which cause a general purpose computer, special purpose computer, or special purpose processing device to perform a certain function or group of functions. Computer-executable instructions include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in mobile computing environments with many types of computer system configurations, including personal computers, hand-held mobile devices, multi-processor systems, microprocessor-based or programmable consumer electronics, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure

The invention claimed is:

1. A mobile communication device, comprising:
   a processor configured to control use of the mobile communication device in accordance with a profile selected from a plurality of profiles by a password, wherein each said profile limits user access to and user awareness of functionalities of the mobile communication device, wherein each said profile is a subset of a master profile that permits user access to and user awareness of all functionalities of the mobile communication device, wherein the selected profile limits said user access and said user awareness by using a sort operation at initiation of operation according to the selected profile, and wherein the sort operation places information into a file that is hidden from the user.

2. The mobile communication device as recited in claim 1 including a display coupled to said processor, wherein said processor is further configured to generate on said display a user interface for profile selection, wherein said user interface prevents user awareness of the remaining profiles during selection of the selected profile.

3. The mobile communication device as recited in claim 1 wherein one of the profiles conceals information that includes contacts, software applications, alerts, notifications, text messages and e-mail messages.

4. The mobile communication device as recited in claim 3 wherein the processor is operable to execute one or more macros for sorting e-mail messages in connection with receiving a password for access to the mobile communication device, and wherein the sorting is performed in accordance with parameters of one of the profiles that is associated with the password.

5. The mobile communication device as recited in claim 4 wherein the sorting includes moving selected e-mail messages into a file hidden from view by users of the mobile communication device.

6. A non-transitory, computer-readable programmable medium operable to cause a processor in a mobile communication device to cooperate with a user to create a plurality of profiles and respectively associated passwords for accessing the profiles, wherein each said profile controls use of the mobile communication device by limiting user access to and user awareness of functionalities of the mobile communication device, wherein each said profile is a subset of a master profile that permits user access to and user awareness of all functionalities of the mobile communication device, wherein at least one of said profiles limits said user access and said user awareness by using a sort operation at initiation of operation according to the at least one profile, and wherein the sort operation places information into a file that is hidden from the user.

7. The non-transitory, computer-readable programmable medium as recited in claim 6, further operable to cause the processor to permit the user to select, for each said profile, applications to be supported by said profile.

8. The non-transitory, computer-readable programmable medium as recited in claim 6, having stored thereon a master application that enables the user to create said profiles.

9. The non-transitory, computer-readable programmable medium as recited in claim 8, wherein the master application runs on the processor as part of a login process.

10. The non-transitory, computer-readable programmable medium as recited in claim 8, having stored thereon an operating system where the master application resides.

11. A method performed on a mobile communication device, comprising:
    providing a plurality of profiles; and
    controlling use of the mobile communication device in accordance with one of said profiles selected from said plurality of profiles by a password;
    wherein each said profile limits user access to and user awareness of functionalities of the mobile communication device, wherein each said profile is a subset of a master profile that permits user access to and user awareness of all functionalities of the mobile communication device, wherein the selected profile limits said user access and said user awareness by using a sort operation at initiation of operation according to the selected profile, and wherein the sort operation places information into a file that is hidden from the user.

12. The method as recited in claim 11, wherein one of said profiles prevents user access to and user awareness of one or more applications.

13. The method as recited in claim 11, wherein one of said profiles prevents user access to and user awareness of one or more data items.

14. The method as recited in claim 11, wherein one of said profiles prevents user access to and user awareness of one or more applications, and prevents user access to and user awareness of one or more data items.

15. The method as recited in claim 11, wherein one of said profiles limits user access to and user awareness of e-mail messages, alerts, push notifications, applications, text messages, photos, photo libraries, notes, videos, settings and medium messages.

16. The method as recited in claim 15 wherein the applications include social media communication applications.

17. The method as recited in claim 15 which further comprises providing at least one user shell in response to said entry of said corresponding access code, each said user shell associated with one of said profiles.

18. The method as recited in claim 17 wherein said providing includes providing a plurality of said user shells that are each associated with a same said user profile.

* * * * *